US010186177B1

(12) United States Patent
Salter et al.

(10) Patent No.: US 10,186,177 B1
(45) Date of Patent: Jan. 22, 2019

(54) VEHICLE WINDSHIELD LIGHTING ASSEMBLY

(71) Applicant: Ford Global Technologies, LLC, Dearborn, MI (US)

(72) Inventors: Stuart C. Salter, White Lake, MI (US); Paul Kenneth Dellock, Northville, MI (US); Tom F. Boettger, Dearborn, MI (US); James J. Surman, Clinton Township, MI (US); David C. Allen, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/702,910

(22) Filed: Sep. 13, 2017

(51) Int. Cl.

| | |
|---|---|
| ***H05B 33/08*** | (2006.01) |
| ***G09F 13/22*** | (2006.01) |
| ***G09F 21/04*** | (2006.01) |
| ***G09F 13/16*** | (2006.01) |
| ***G09F 13/00*** | (2006.01) |
| ***F21V 7/00*** | (2006.01) |
| ***F21V 9/30*** | (2018.01) |
| *B60J 1/02* | (2006.01) |

(52) U.S. Cl.
CPC ................ *G09F 13/22* (2013.01); *F21V 7/00* (2013.01); *F21V 9/30* (2018.02); *G09F 13/005* (2013.01); *G09F 13/16* (2013.01); *G09F 21/048* (2013.01); *H05B 33/0854* (2013.01); *B60J 1/02* (2013.01); *G09F 2013/227* (2013.01)

(58) Field of Classification Search
CPC .. B60R 1/10; B60R 1/04; B60R 11/04; H04N 5/374; H04N 5/23238; H04N 7/18; H04N 7/183
See application file for complete search history.

(56) References Cited

U.S. PATENT DOCUMENTS

| | | | | |
|---|---|---|---|---|
| 2,486,859 | A | 11/1949 | Meijer et al. | |
| 5,053,930 | A | 10/1991 | Benavides | |
| 5,434,013 | A | 7/1995 | Fernandez | |
| 5,668,663 | A * | 9/1997 | Varaprasad | B32B 17/06 359/265 |
| 5,709,453 | A | 1/1998 | Krent et al. | |
| 5,839,718 | A | 11/1998 | Hase et al. | |
| 6,031,511 | A | 2/2000 | DeLuca et al. | |
| 6,117,362 | A | 9/2000 | Yen et al. | |
| 6,294,990 | B1 | 9/2001 | Knoll et al. | |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Douglas W Owens
*Assistant Examiner* — Syed M Kaiser
(74) *Attorney, Agent, or Firm* — Jason Rogers; Price Heneveld LLP

(57) ABSTRACT

A lighting assembly of a vehicle is provided herein including a windshield and an electroluminescent member sealed within the windshield and configured to illuminate in response to applied electrical power. A reflector is optically coupled to the electroluminescent member and is configured to enhance the brightness thereof. A fit is coupled to the windshield and is positioned to at least partially conceal the electroluminescent member from a driver of the vehicle.

18 Claims, 4 Drawing Sheets

16 30 32 14

(56) References Cited

U.S. PATENT DOCUMENTS 6,419,854 B1 7/2002 Yocom et al.
6,494,490 B1 12/2002 Trantoul
6,577,073 B2 6/2003 Shimizu et al.
6,729,738 B2 5/2004 Fuwausa et al.
6,737,964 B2 5/2004 Samman et al.
6,773,129 B2 8/2004 Anderson, Jr. et al.
6,820,888 B1 11/2004 Griffin
6,851,840 B2 2/2005 Ramamurthy et al.
6,859,148 B2 2/2005 Miller
6,871,986 B2 3/2005 Yamanaka et al.
6,953,536 B2 10/2005 Yen et al.
6,990,922 B2 1/2006 Ichikawa et al.
7,015,893 B2 3/2006 Li et al.
7,036,770 B2 * 5/2006 Shelly .................... B64D 39/04 244/135 A
7,161,472 B2 1/2007 Strumolo et al.
7,213,923 B2 5/2007 Liu et al.
7,216,997 B2 5/2007 Anderson, Jr.
7,249,869 B2 7/2007 Takahashi et al.
7,264,366 B2 9/2007 Hulse
7,264,367 B2 9/2007 Hulse
7,347,576 B2 3/2008 Wang et al.
7,441,914 B2 10/2008 Palmer et al.
7,501,749 B2 3/2009 Takeda et al.
7,575,349 B2 8/2009 Bucher et al.
7,635,212 B2 12/2009 Seidler
7,726,856 B2 6/2010 Tsutsumi
7,745,818 B2 6/2010 Sofue et al.
7,753,541 B2 7/2010 Chen et al.
7,834,548 B2 11/2010 Jousse et al.
7,862,220 B2 1/2011 Cannon et al.
7,987,030 B2 7/2011 Flores et al.
8,016,465 B2 9/2011 Egerer et al.
8,022,818 B2 9/2011 la Tendresse et al.
8,044,415 B2 10/2011 Messere et al.
8,066,416 B2 11/2011 Bucher
8,071,988 B2 12/2011 Lee et al.
8,097,843 B2 1/2012 Agrawal et al.
8,118,441 B2 2/2012 Hessling
8,120,236 B2 2/2012 Auday et al.
8,136,425 B2 3/2012 Bostick
8,163,201 B2 4/2012 Agrawal et al.
8,169,131 B2 5/2012 Murazaki et al.
8,178,852 B2 5/2012 Kingsley et al.
8,197,105 B2 6/2012 Yang
8,203,260 B2 6/2012 Li et al.
8,207,511 B2 6/2012 Bortz et al.
8,232,533 B2 7/2012 Kingsley et al.
8,247,761 B1 8/2012 Agrawal et al.
8,261,686 B2 9/2012 Birman et al.
8,286,378 B2 10/2012 Martin et al.
8,317,329 B2 11/2012 Seder et al.
8,317,359 B2 11/2012 Harbers et al.
8,408,766 B2 4/2013 Wilson et al.
8,415,642 B2 4/2013 Kingsley et al.
8,421,811 B2 4/2013 Odland et al.
8,459,832 B2 6/2013 Kim
8,466,438 B2 6/2013 Lambert et al.
8,519,359 B2 8/2013 Kingsley et al.
8,519,362 B2 8/2013 Labrot et al.
8,539,702 B2 9/2013 Li et al.
8,552,848 B2 10/2013 Rao et al.
8,606,430 B2 12/2013 Seder et al.
8,624,716 B2 1/2014 Englander
8,631,598 B2 1/2014 Li et al.
8,653,553 B2 2/2014 Yamazaki et al.
8,664,624 B2 3/2014 Kingsley et al.
8,683,722 B1 4/2014 Cowan
8,724,054 B2 5/2014 Jones
8,754,426 B2 6/2014 Marx et al.
8,773,012 B2 7/2014 Ryu et al.
8,846,184 B2 9/2014 Agrawal et al.
8,851,694 B2 10/2014 Harada
8,876,352 B2 11/2014 Robbins et al.
8,905,610 B2 12/2014 Coleman et al.
8,952,341 B2 2/2015 Kingsley et al.
8,994,495 B2 3/2015 Dassanayake et al.
9,006,751 B2 4/2015 Kleo et al.
9,018,833 B2 4/2015 Lowenthan et al.
9,057,021 B2 6/2015 Kingsley et al.
9,059,378 B2 6/2015 Verger et al.
9,065,447 B2 6/2015 Buttolo et al.
9,067,530 B2 6/2015 Bayersdorfer et al.
9,187,034 B2 11/2015 Tarahomi et al.
9,299,887 B2 3/2016 Lowenthal et al.
9,315,148 B2 4/2016 Schwenke et al.
9,399,844 B1 * 7/2016 King .................... G02B 6/0011
9,452,709 B2 9/2016 Aburto Crespo
9,568,659 B2 2/2017 Verger et al.
9,616,812 B2 4/2017 Sawayanagi
2002/0159741 A1 10/2002 Graves et al.
2002/0163792 A1 11/2002 Formosa
2003/0167668 A1 9/2003 Fuks et al.
2003/0179548 A1 9/2003 Becker et al.
2004/0180235 A1 * 9/2004 Yamamoto ........... C07D 487/04 428/690
2004/0213088 A1 10/2004 Fuwausa
2005/0084229 A1 4/2005 Babbitt et al.
2005/0189795 A1 9/2005 Roessler
2006/0061008 A1 * 3/2006 Karner ................ B29C 45/0017 264/250
2006/0087826 A1 4/2006 Anderson, Jr.
2006/0097121 A1 5/2006 Fugate
2007/0032319 A1 2/2007 Tufte
2007/0177370 A1 * 8/2007 Nakamura ............. H01H 13/83 362/84
2007/0285938 A1 12/2007 Palmer et al.
2007/0297045 A1 12/2007 Sakai et al.
2008/0205075 A1 8/2008 Hikmet et al.
2008/0260622 A1 * 10/2008 Graham .................... C09C 1/00 423/594.9
2009/0217970 A1 9/2009 Zimmerman et al.
2009/0219730 A1 9/2009 Syfert et al.
2009/0251920 A1 10/2009 Kino et al.
2009/0260562 A1 10/2009 Folstad et al.
2009/0262515 A1 10/2009 Lee et al.
2010/0102736 A1 4/2010 Hessling
2011/0012062 A1 1/2011 Agrawal et al.
2011/0259744 A1 * 10/2011 Moyle .............. G01N 27/44726 204/461
2011/0265360 A1 11/2011 Podd et al.
2012/0001406 A1 1/2012 Paxton et al.
2012/0104954 A1 5/2012 Huang
2012/0183677 A1 7/2012 Agrawal et al.
2012/0280528 A1 11/2012 Dellock et al.
2012/0318023 A1 * 12/2012 Shimomura ............ C03C 27/06 65/43
2013/0050979 A1 2/2013 Van De Ven et al.
2013/0069045 A1 * 3/2013 Otsuki ................ H01L 27/1225 257/40
2013/0092965 A1 4/2013 Kijima et al.
2013/0335994 A1 12/2013 Mulder et al.
2014/0003044 A1 1/2014 Harbers et al.
2014/0029281 A1 1/2014 Suckling et al.
2014/0065442 A1 3/2014 Kingsley et al.
2014/0103258 A1 4/2014 Agrawal et al.
2014/0211498 A1 7/2014 Cannon et al.
2014/0264396 A1 9/2014 Lowenthal et al.
2014/0266666 A1 9/2014 Habibi
2014/0373898 A1 12/2014 Rogers et al.
2015/0015713 A1 * 1/2015 Wang ....................... H04N 7/18 348/148
2015/0046027 A1 2/2015 Sura et al.
2015/0085488 A1 3/2015 Grote, III et al.
2015/0109602 A1 4/2015 Martin et al.
2015/0138789 A1 5/2015 Singer et al.
2015/0267881 A1 9/2015 Salter et al.
2015/0307033 A1 10/2015 Preisler et al.
2016/0016506 A1 1/2016 Collins et al.
2016/0102819 A1 4/2016 Misawa et al.
2016/0131327 A1 5/2016 Moon et al.
2016/0236613 A1 8/2016 Trier
2016/0240794 A1 * 8/2016 Yamada .............. H01L 51/0072

(56) References Cited

U.S. PATENT DOCUMENTS

2017/0158125 A1 6/2017 Schuett et al.
2017/0237946 A1* 8/2017 Schofield ............... H04N 7/183
348/148
2017/0253179 A1 9/2017 Kumada
2017/0261830 A1* 9/2017 Luten ...................... B60R 1/025
2018/0076394 A1* 3/2018 Kawakami .......... H01L 51/0065

FOREIGN PATENT DOCUMENTS

| | | | |
|---|---|---|---|
| CN | 201193011 | Y | 2/2009 |
| CN | 204127823 | U | 1/2015 |
| DE | 4120677 | A1 | 1/1992 |
| DE | 29708699 | U1 | 7/1997 |
| DE | 10319396 | A1 | 11/2004 |
| EP | 1793261 | A1 | 6/2007 |
| EP | 2778209 | A1 | 9/2014 |
| JP | 2000159011 | A | 6/2000 |
| JP | 2007238063 | A | 9/2007 |
| KR | 20060026531 | A | 3/2006 |
| WO | 2006047306 | A1 | 5/2006 |
| WO | 2014068440 | A1 | 5/2014 |
| WO | 2014161927 | A1 | 10/2014 |

* cited by examiner

VEHICLE WINDSHIELD LIGHTING ASSEMBLY

FIELD OF THE INVENTION

The present invention generally relates to vehicle lighting assemblies, and more particularly, lighting assemblies adapted for a windshield.

BACKGROUND OF THE INVENTION

Vehicle windshields provide lighting opportunities for enhancing the appearance of a vehicle. Accordingly, there is a need for a lighting assembly adapted to a windshield and offering high visibility. The present disclosure is intended to satisfy this need.

SUMMARY OF THE INVENTION

According to one aspect of the present invention, a lighting assembly of a vehicle is provided including a windshield and an electroluminescent member sealed within the windshield and configured to illuminate in response to applied electrical power. A reflector is optically coupled to the electroluminescent member and is configured to enhance the brightness thereof. A frit is coupled to the windshield and is positioned to at least partially conceal the electroluminescent member from a driver of the vehicle.

Embodiments of the first aspect of the invention can include any one or a combination of the following features:

- the electroluminescent member includes a white electroluminescent paint having a bluish tint;
- the electroluminescent member includes a plurality of phosphors, at least a portion of which are configured to emit light in response to applied electrical power;
- a portion of the phosphors are photoluminescent and are configured to luminesce in response to light excitation;
- the electroluminescent member includes an electroluminescent paint and the reflector includes a plurality of reflective glass beads dispersed in the electroluminescent paint;
- the frit includes a plurality of black dots that are tightly grouped so as to lessen the driver's visibility of the electroluminescent member;
- a controller is operably coupled to the electroluminescent member and is configured to control an illumination state of the electroluminescent member;
- the controller activates the electroluminescent member based on input indicating a dark condition;
- the controller activates the electroluminescent member based on input received from a user-input device;
- the controller applies increasing electrical power to the electroluminescent member over time in order to maintain constant brightness thereof;
- the controller applies electrical power to the electroluminescent member such that the brightness of the electroluminescent member increases in conjunction with increasing vehicle speed or engine turn; and
- the controller applies electrical power to the electroluminescent member such that the brightness of the electroluminescent member decreases in conjunction with decreasing vehicle speed or engine turn.

According to a second aspect of the present invention, a lighting assembly for a windshield of a vehicle is provided. An electroluminescent paint is sealed within the windshield and is configured to illuminate in response to applied electrical power. A plurality of reflective glass beads is integrated within the electroluminescent paint and is configured to enhance the brightness thereof. A frit is coupled to the windshield and is positioned to at least partially conceal the electroluminescent paint from a driver of the vehicle.

Embodiments of the second aspect of the invention can include any one or a combination of the following features:

- the electroluminescent paint includes a plurality of phosphors, at least a portion of which are configured to emit light in response to applied electrical power;
- a portion of the phosphors are configured to luminesce in response to light excitation; and
- a controller is configured to apply increasing electrical power to the electroluminescent member over time in order to maintain constant brightness thereof.

According to a third aspect of the present invention, a lighting assembly for a vehicle windshield is provided. An electroluminescent member is sealed within the vehicle windshield and is configured to illuminate in response to applied electrical power. A reflector is optically coupled to the electroluminescent member and is configured to enhance the brightness thereof. A controller is operably coupled to the electroluminescent member and is configured to apply increasing electrical power to the electroluminescent member over time in order to maintain constant brightness thereof.

Embodiments of the third aspect of the invention can include any one or a combination of the following features:

- the controller applies electrical power to the electroluminescent member such that the brightness of the electroluminescent member increases in conjunction with increasing vehicle speed or engine turn;
- the controller applies electrical power to the electroluminescent member such that the brightness of the electroluminescent member decreases in conjunction with decreasing vehicle speed or engine turn; and
- the electroluminescent paint includes a plurality of phosphors, a portion of which are configured to luminesce in response to light excitation.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
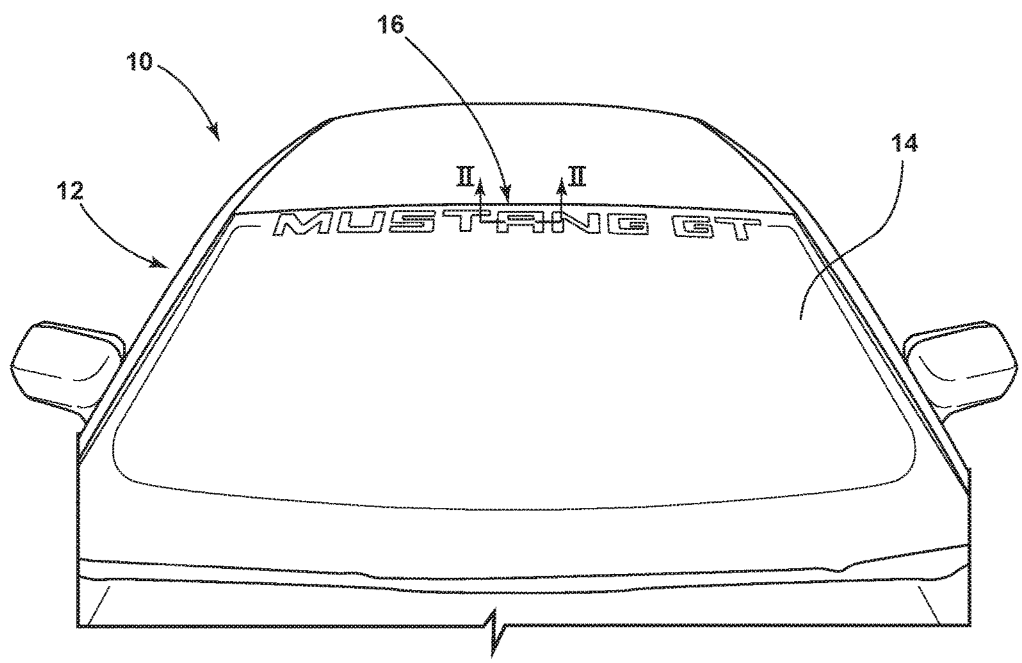
FIG. 1 is front perspective view of a vehicle equipped with a lighting assembly having an electroluminescent member adapted to a windshield.

Referring to FIG. 1, a lighting assembly 10 of a vehicle 12 is shown including a windshield 14, which is exemplarily shown as a front windshield. The lighting assembly 10 also includes an electroluminescent (EL) member 16 sealed within the windshield 14 and configured to illuminate in response to an electrical power applied thereto. In the depicted embodiment, the EL member 16 is exemplarily embodied as a text graphic, but may be alternatively embodied as an icon, emblem, badge, or other desired graphic. The EL member 16 is exemplarily located at an upper region of the windshield 14, but may be elsewhere located on the windshield 14. While the electroluminescent member 16 is shown coupled to a front windshield, it will be appreciated that the electroluminescent member 16 may be adapted to a rear windshield and/or side windows of the vehicle 12.

Figure 2:
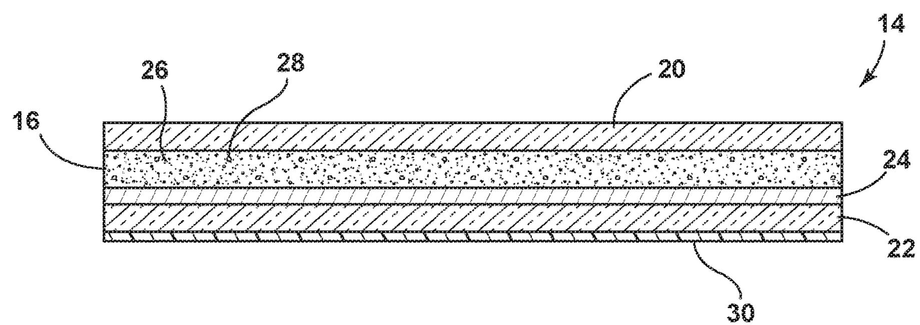
FIG. 2 is a cross-sectional view taking along line II-II of FIG. 1.

Referring to FIG. 2, the windshield 14 is shown having a first glass layer 20 and a second glass layer 22. In the depicted embodiment, the first glass layer 20 is exposed to the exterior of the vehicle 12 whereas the second glass layer 22 is exposed to the interior of the vehicle 12. The first and second glass layers 20, 22 are generally disposed to face one another and may be planar and/or curved. For purposes of illustration, the first and/or second glass layer 20, 22 may be laminated with a polyvinyl butyral (PVB) interlayer 24.

The EL member 16 is shown disposed between the first and second glass layers 20, 22. The EL member 16 may be directly coupled to the PVB interlayer 24, the first glass layer 20, and/or the second glass layer 22. The EL member 16 is configured as a paint and includes one or more phosphors 26 therein for emitting light when an electrical power is applied to the EL member 16. In the depicted embodiment, the EL member 16 is a reflective white paint selected to enhance the brightness of light emitted by the EL member 16. Additionally, the EL member 16 may have a colored tint (e.g., bluish tint) if desired. To further enhance the brightness of the EL member 16, a reflector 28 is optically coupled to the EL member 16 and may be integrated therewith. For example, the reflector 28 is shown in the form of a plurality of reflective glass beads dispersed in the EL member 16 amongst the phosphors 26.

In some embodiments, a portion of the phosphors 26 is photoluminescent and is configured to luminesce in response to ultraviolet (UV) light excitation by sunlight or other light source. In such embodiments, the EL member 16 is capable of passive illumination based on the availability of the excitation light. A long-persistent photoluminescent material may be used such that the photoluminescent material continues to luminesce for a period of time after light excitation ceases to be provided.

Figure 3:
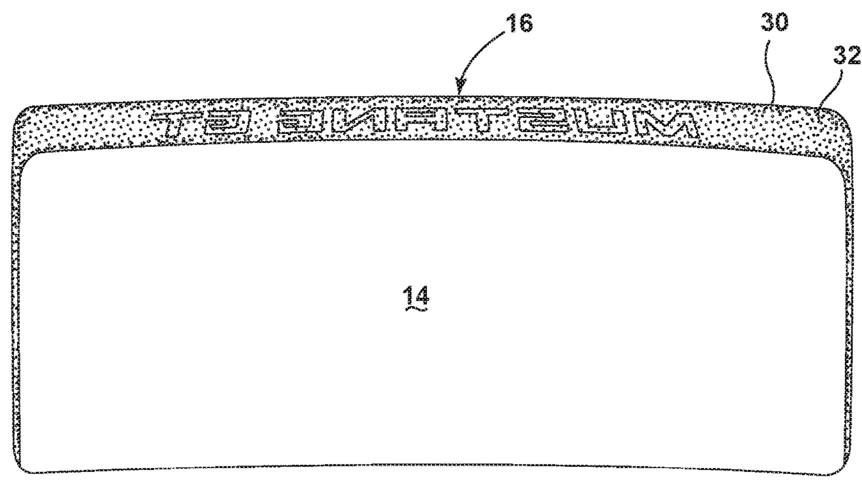
FIG. 3 illustrates the windshield from a vantage point of a driver of the vehicle.

Referring to FIGS. 2 and 3, a fit 30 is coupled to the windshield 14 and is positioned to at least partially conceal the EL member 16 from a driver of the vehicle 12. For example, the frit 30 is shown coupled to the second glass layer 22 and may include a plurality of black dots 32 tightly grouped so as to lessen the driver's visibility of the EL member 16. It is contemplated that the black dots may be grouped to enable the driver to see a faint glow when the EL member 16 illuminates. In this manner, the driver is aware that the EL member 16 is in an illuminated state but is not overly distracted by the illumination of the EL member 16.

Figure 4:
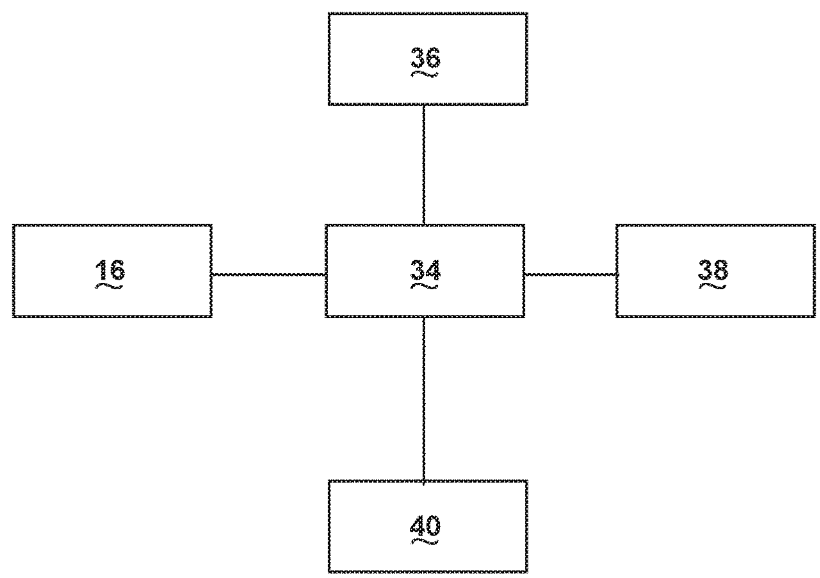
FIG. 4 is a block diagram of the lighting assembly.

Referring to FIG. 4, the EL member 16 is electrically coupled to a controller 34 using wires, conductive film, or other connective means. The controller 34 is configured to control an illumination state of the EL member 16, or in other words, activate or deactivate the EL member 16. To do so, the controller 34 may selectively apply electrical power to the EL member 16 based on one or more inputs. In one embodiment, the controller 34 applies electrical power to the EL member 16 based on input from a light sensor 36 of the vehicle 12. For example, the controller 34 may apply electrical power to the EL member 16 when input from the light sensor 36 indicates dark conditions. The controller 34 may vary the electrical power applied to the EL member 16 based on a darkness level sensed by the light sensor 36. For example, the controller 34 may apply decreasing amounts of electrical power to the EL member 16 as the darkness level increases.

In another embodiment, the controller 34 activates/deactivates the EL member 16 based on input received from a user-input device 38 such as, but not limited to, a touchscreen display of the vehicle 12. This enables the driver or other user to manually control the illumination state of the EL member 16. In yet another embodiment, the controller 34 activates/deactivates the EL member 16 based on input received from a vehicle lighting control system 40. For example, the vehicle lighting control system 40 may control the illumination state of one or more vehicle lights during start-up, drive, idle, and/or shut-off. In one specific scenario, the controller 34 activates the EL member 16 for a predetermined period of time after shut-off. In another specific scenario, the controller 34 temporarily activates the EL member 16 when the doors of the vehicle 12 are unlocked or during start-up. In yet another specific scenario, the controller 34 applies electrical power to the EL member 16 such that the brightness of the EL member 16 increases/decreases in conjunction with increasing/decreasing vehicle speed or engine turn (i.e., revolutions per minute (RPM)). It is contemplated that any or all of the aforementioned features may be selected by the driver or other user via the user-input device 38.

Figure 5:
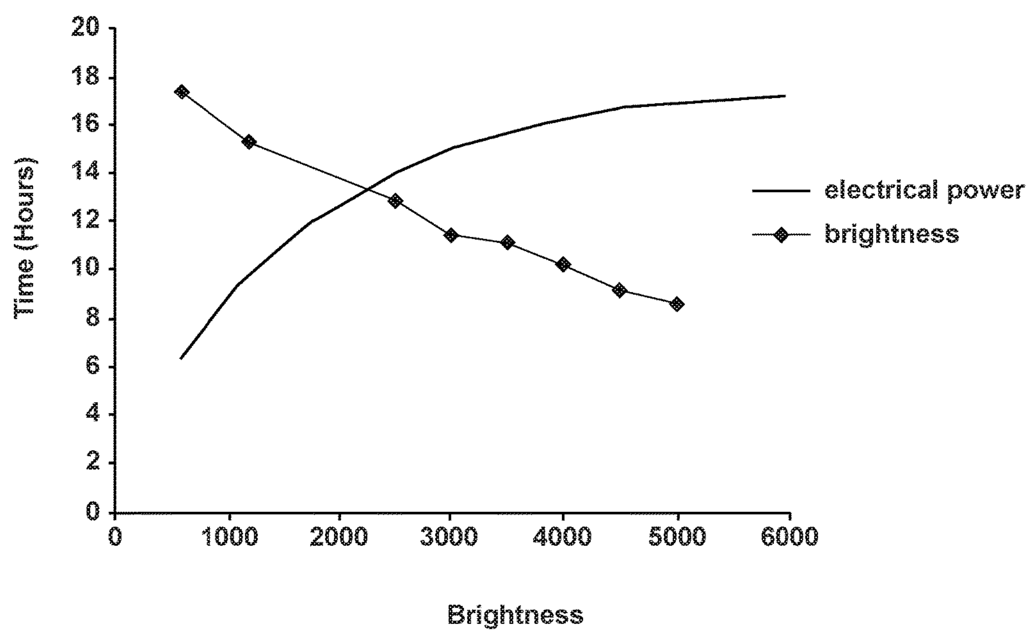
FIG. 5 is a graph illustrating an increase in electrical power applied to the electroluminescent member over time in an effort to maintain constant brightness of the electroluminescent member.

With respect to paint embodiments, the brightness level of the EL member 16 may decrease over time. Accordingly, it is contemplated that the controller 34 may gradually increase electrical power applied to the EL member 16 as a function of time (FIG. 5). As a result, a substantially constant brightness level of the EL member 16 is achieved.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described lighting assembly, and other components, is not limited to any specific material. Other exemplary embodiments of the lighting assembly disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the lighting assembly, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the lighting assembly may be varied, and the nature or number of adjustment positions provided between the elements may be varied. It should be noted that the elements and/or assemblies of the lighting assembly may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

What is claimed is:

1. A lighting assembly of a vehicle, comprising:

a windshield;

an electroluminescent member sealed within the windshield and configured to illuminate in response to applied electrical power;

a reflector optically coupled to the electroluminescent member and configured to enhance the brightness thereof, and a frit coupled to the windshield and positioned to at least partially conceal the electroluminescent member from a driver of the vehicle, wherein the frit comprises a plurality of black dots that are tightly grouped so as to lessen the driver's visibility of the electroluminescent member.

2. The lighting assembly of claim 1, wherein the electroluminescent member comprises a white electroluminescent paint having a bluish tint.

3. The lighting assembly of claim 1, wherein the electroluminescent member comprises a plurality of phosphors, at least a portion of which are configured to emit light in response to applied electrical power.

4. The lighting assembly of claim 3, wherein a portion of the phosphors are photoluminescent and are configured to luminesce in response to light excitation.

5. The lighting assembly of claim 1, wherein the electroluminescent member comprises an electroluminescent paint and the reflector comprises a plurality of reflective glass beads dispersed in the electroluminescent paint.

6. The lighting assembly of claim 1, further comprising a controller operably coupled to the electroluminescent member and configured to control an illumination state of the electroluminescent member.

7. The lighting assembly of claim 6, wherein the controller activates the electroluminescent member based on input indicating a dark condition.

8. The lighting assembly of claim 6, wherein the controller activates the electroluminescent member based on input received from a user-input device.

9. The lighting assembly of claim 6, wherein the controller applies increasing electrical power to the electroluminescent member over time in order to maintain constant brightness thereof.

10. The lighting assembly of claim 6, wherein the controller applies electrical power to the electroluminescent member such that the brightness of the electroluminescent member increases in conjunction with increasing vehicle speed or engine turn.

11. The lighting assembly of claim 10, wherein the controller applied electrical power to the electroluminescent member such that the brightness of the electroluminescent member decreases in conjunction with decreasing vehicle speed or engine turn.

12. A lighting assembly for a windshield of a vehicle, comprising:

an electroluminescent paint sealed within the windshield and configured to illuminate in response to applied electrical power;

a plurality of reflective glass beads integrated within the electroluminescent paint and configured to enhance the brightness thereof, and a frit coupled to the windshield and positioned to at least partially conceal the electroluminescent paint from a driver of the vehicle.

13. The lighting assembly of claim 12, wherein the electroluminescent paint comprises a plurality of phosphors, at least a portion of which are configured to emit light in response to applied electrical power.

14. The lighting assembly of claim 12, wherein a portion of the phosphors are configured to luminesce in response to light excitation.

15. The lighting assembly of claim 12, further comprising a controller configured to apply increasing electrical power to the electroluminescent member over time in order to maintain constant brightness thereof.

16. A lighting assembly for a vehicle windshield, comprising:

an electroluminescent member sealed within the vehicle windshield and configured to illuminate in response to applied electrical power;

a reflector optically coupled to the electroluminescent member and configured to enhance brightness; and a controller operably coupled to the electroluminescent member and configured to apply increasing electrical power to the electroluminescent member such that the brightness of the electroluminescent member increases in conjunction with increasing vehicle speed or engine turn.

17. The lighting assembly of claim 16, wherein the controller applies electrical power to the electroluminescent member such that the brightness of the electroluminescent member decreases in conjunction with decreasing vehicle speed or engine turn.

18. The lighting assembly of claim 16, wherein the electroluminescent member comprises a plurality of phosphors, a portion of which are configured to luminesce in response to light excitation.

* * * * *